United States Patent [19]
Kidd et al.

[11] Patent Number: 5,108,817
[45] Date of Patent: Apr. 28, 1992

[54] MULTI-COMPONENT HEAT SHIELD

[75] Inventors: Joseph C. Kidd, Middletown; Richard L. Maine, North Windham, both of Conn.; Graham K. Morbey, Amherst, Mass.

[73] Assignee: Lydall, Inc., Manchester, Conn.

[21] Appl. No.: 516,205

[22] Filed: Apr. 30, 1990

[51] Int. Cl.$^5$ ............................................. B32B 9/00
[52] U.S. Cl. .................................. 428/192; 428/212; 428/457; 428/472.2; 428/913; 296/39.3
[58] Field of Search ............ 428/192, 212, 457, 472.2, 428/913; 296/39.3

[56] References Cited

U.S. PATENT DOCUMENTS

| | | | |
|---|---|---|---|
| 3,199,715 | 8/1965 | Paivanas | 220/426 |
| 3,244,224 | 4/1966 | Hnilicka | 165/32 |
| 3,756,623 | 9/1973 | Whittler | 280/289 |
| 3,799,056 | 3/1974 | Colignon | 102/105 |
| 4,085,816 | 4/1978 | Amagai et al. | 180/64 A |
| 4,099,496 | 7/1978 | Nagase et al. | 123/41.31 |
| 4,344,591 | 8/1982 | Jackson | 244/158 A |
| 4,349,078 | 9/1982 | Shimada et al. | 180/69.1 |
| 4,433,542 | 2/1984 | Shimura | 60/299 |
| 4,478,310 | 10/1984 | Harter | 181/241 |
| 4,508,771 | 4/1985 | Peoples, Jr. et al. | 428/95 |
| 4,741,411 | 5/1988 | Stricker | 181/283 |

FOREIGN PATENT DOCUMENTS 475800 5/1975 Australia.
2196097 4/1988 United Kingdom.

Primary Examiner—Patrick J. Ryan
Assistant Examiner—Elizabeth Evans
Attorney, Agent, or Firm—McCormick, Paulding & Huber

[57] ABSTRACT

A multi-component heat shield is provided. The shield includes at least one heat insulating component and at least one heat reflecting component having different coefficients of thermal expansion. The insulating and reflecting components are arranged with at least a portion of one of the insulating component's surfaces in registration with at least a portion of one of the reflecting component's surfaces. Movement of the components relative to one another is restricted at selected positions while the movement of the components is unrestrained between these positions. As heat is applied to the shield, the component with the greater coefficient of thermal expansion tends to expand at a greater rate than the component having the lower coefficient of thermal expansion. The stress which develops in the shield due to the restriction of the components at the selected positions is accompanied by changes in the spacing between the components.

46 Claims, 2 Drawing Sheets

MULTI-COMPONENT HEAT SHIELD

BACKGROUND OF THE INVENTION

The present invention relates to a multi-component heat shield. More particularly, the present invention provides a multi-component heat shield for use in a motor vehicle.

The exhaust systems currently found in motor vehicles such as car, vans and light trucks typically include a number of elements designed to operate at elevated temperatures. Devices such as catalytic converters, mufflers and portions of the exhaust system piping commonly reach temperatures well over 800° F. during normal vehicle operation. The temperature of a catalytic converter may exceed 1200° F. during prolonged periods of motor idling.

It is Particularly important, for obvious reasons, to shield both the Passenger and storage compartments of a vehicle from the excessive heat Produced by its exhaust system. Over the past several years, however, it has become increasingly more difficult, due to overall trends in the automotive industry, to protect passengers and cargo from exhaust system heat.

To meet fuel economy standards, automakers have generally down-sized and streamlined their vehicles and powered them With compact, high performance engines which work harder and operate at temperatures considerably higher than the larger, less sophisticated engines employed ten or fifteen years ago. Moreover, to reduce pollutants and meet federally mandated emission standards, pollution control devices specifically designed to operate at elevated temperatures have been added to vehicle exhaust systems.

Thus, late-model vehicles produce more engine and exhaust system heat than their older counterparts and afford less space for dissipating this heat. Accordingly, it is not uncommon to find 800° F. exhaust pipes or a 1200° F. catalytic converter positioned within a few inches of a vehicle's floor. Not surprisingly, there have been a number of reported cases where passengers have received severe burns from contact with the metallic floor of a pick-up truck or van, as well as incidents where cargo has been damaged from the heat present in an inadequately shielded storage compartment.

It is, therefore, an object of the present invention to provide an inexpensive, light weight heat shield which will effectively reduce the heat transmitted from a vehicle's exhaust system to its passenger and storage compartments.

It is a further object of the present invention to provide such an improved heat shield which is also adapted to fit within spaces of limited clearance between the vehicle's exhaust system and its floor.

It is a still further object of the present invention to provide such an improved heat shield which may be installed on the vehicle at the factory or as an aftermarket improvement.

SUMMARY OF THE INVENTION

The Present invention meets the above-stated objectives by providing a multi-component heat shield including a first component having a first surface and a second heat insulating component having a second surface and an opposite surface. The materials comprising the first and second components are selected so that the components have different coefficients of thermal expansion.

The components are arranged so that at least a portion of the first surface is in registration with at least a portion of the second surface over a given common area. Means are Provided so that as heat is applied to the shield movement of the components relative to one another is restrained at selected positions. The components are free to move relative to one another between the selected positions so that differences in the lengths of the first and second components between the selected positions due to changes in the temperatures of the components are accompanied by an increase in the spacing between the first and second surfaces. It is believed that the improved insulating capacity of the heat shield results in large part from the increase in the spacing between the portions of the first and second surfaces.

In a preferred embodiment of the invention, the first component is a heat reflecting component having a coefficient of thermal expansion greater than that of the heat insulating component. However, it must be understood that the invention is not limited in this regard. The first component need not have a coefficient of thermal expansion greater than that of the insulating component, and, in fact, the present invention contemplates a heat shield having a first component Which is heat absorbing.

In one application of the present invention, the heat shield is mounted on a motor vehicle between the heat emitting elements of the vehicle's exhaust system and its passenger or storage compartments. The shield is mounted with the opposite surface of the heat insulating component attached adjacent to the underside of the vehicle s floor. As the shield is subjected to heat emitted by the exhaust system, the first component, which in this application is heat reflecting and has a higher coefficient of thermal expansion than the shield's heat insulating component, moves away from the insulating component and toward the heat source With a resulting increase in the insulating capacity of the shield.

DETAILED DESCRIPTION OF THE INVENTION

Figure 1:
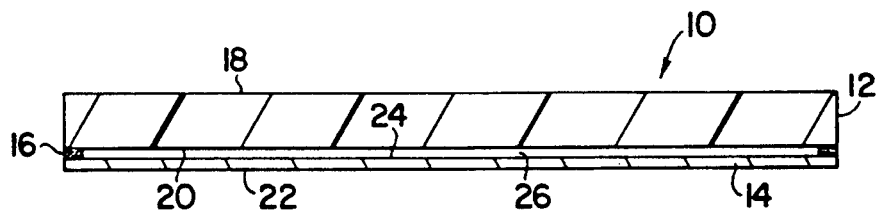
FIG. 1 is a cross-sectional view of a heat shield as taught by the present invention.

FIG. 1 illustrates a preferred embodiment of the heat shield taught by the present invention. The heat shield 10 comprises a heat insulating component 12, a heat reflecting component 14 and a bead of adhesive 16 rigidly connecting the reflecting and insulating components.

In the embodiment of the invention shown in FIG. 1 the materials comprising the components are selected so that the heat insulating component has a lower coefficient of thermal expansion than the heat reflecting component. The insulating component 12 may be formed from any rigid material which provides the required insulating properties. Rigid sheet materials are particularly useful in this regard such as, for example, thermoset, thermoplastic and fiber-reinforced composite sheet materials in a preferred embodiment of the invention, the insulating component comprises a rigid, thermoset, sheet material.

In the most preferred embodiment of invention, the thermoset sheet material is a phenolic sheet molding compound such as, for example, "LYTHERM 1000" available from Lydall, Inc., Manchester, Conn. The "LYTHERM" sheet comprising the insulating component 12 preferably has a thermal conductivity of less than 0.3W/mK and a coefficient of thermal expansion of about $3 \times 10^{-6}$° F. The sheet is moulded to a density of approximately 1.2 g/cc and a thickness of about 2-3 mm. The "LYTHERM" sheet is fully cured and the surfaces 18, 20 of the insulating component are coated with a heat resistant and heat reflective material such as, for example, aluminum foil or a heat resistant and heat reflective paint. According to the most preferred embodiment of the invention, the surfaces 18, 20 are painted with "LO/MIT-1", a radiant barrier, low emissivity coating available from Solar Energy Corp., Princeton, N.J.

Still referring to FIG. 1, the heat reflecting component 14 comprises any suitable material having the ability to reflect infrared radiation. Preferably, the reflecting component is formed from a metallic sheet material. In the most preferred embodiment of the invention, the reflecting component 14 is formed from aluminum sheet stock which has a thickness of about 0.018 inches and a coefficient of thermal expansion of about $1.224 \times 10^{-5}$° F. The aluminum sheet stock is manufactured so that the surfaces 22, 24 of component 14 have a soft temper, mill finish. Aluminum sheet stock meeting these requirements are available from, for example, DIY Aluminum, Oklahoma City, Okla. (Stock #0601), Eastern Aluminum Sheet and Extrusion Company, Richmond, Va. (Stock #1120) and Metal Foils, Inc., Wickliffe, Ohio (Stock QQ-A-2501).

Figure 3:
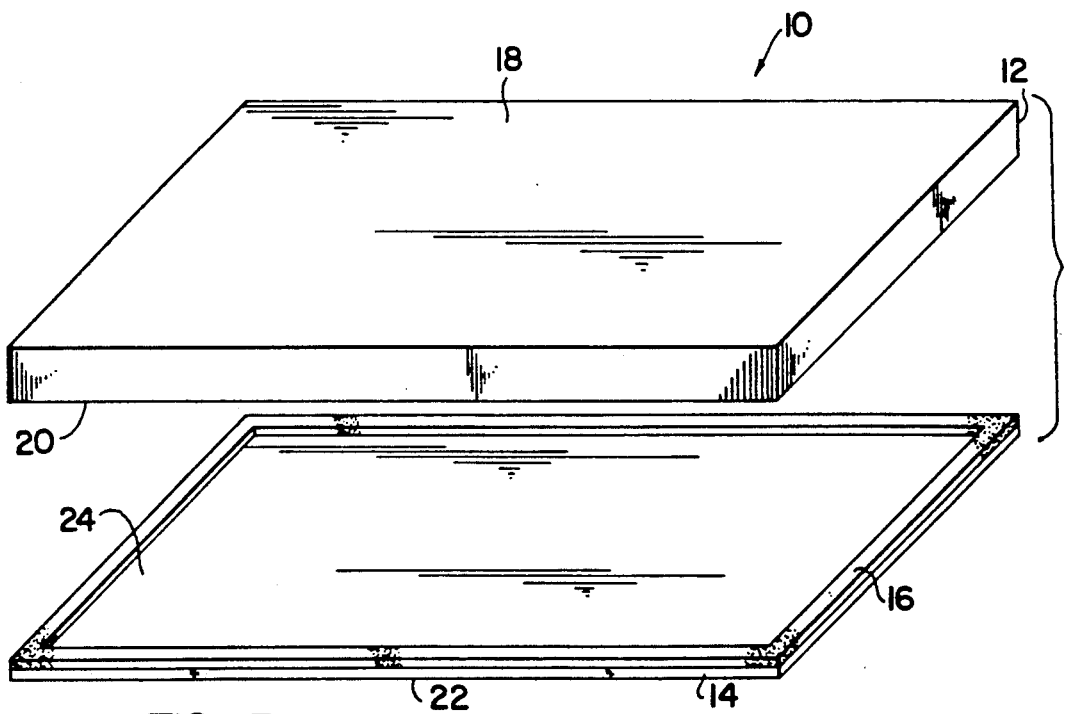
FIG. 3 is an exploded perspective view of the heat shield shown in FIG. 1.

Referring now to FIG. 3, the shield 10 is assembled so that at least a portion of surface 20 is in registration with at least a portion of surface 24 over a common area. In the most preferred embodiment of the invention shown in FIG. 3, the surfaces 20 and 24 are co-extensive. However, it is to be understood that the invention is not limited in this regard, and a shield constructed with reflecting and insulating components having dissimilar surface areas are within the scope of the appended claims.

Means are provided to restrict the movement of components 12 and 14 at selected positions. In the most preferred embodiment of the invention this is accomplished by rigidly connecting the heat reflecting component to the heat insulating component at selected contact positions along the perimeter of the common area such as, for example, by applying a bead of adhesive 16 along the entire perimeter. Silicone caulk adhesives are particularly useful for this purpose such as, for example, silicone caulk adhesive, Construction Stock No. SCS 1001, available from the General Electric Co., Waterford, N.Y. Alternatively, the components could be connected by fasteners such as rivets, screws, clips or bolts placed along the perimeter of the common area.

Here, again, it must be understood that the invention is not limited in this regard. The location of the selected positions at which the components are rigidly connected together may vary widely as long as a common area between the selected positions is provided over which at least a portion of surfaces 20 and 24 are in registration. Alternatively, the components 12 and 14 need not be connected together at all; a separate mounting member may be provided which rigidly supports each component in a desired position relative to the other.

Referring again to FIG. 1, in a preferred embodiment of the invention, the shield 10 is assembled with the surfaces 20 and 24 in spaced relationship. In the most preferred embodiment of the invention, the space 26 between the heat reflecting and heat insulating components is from about 0.031 inches to about 0.093 inches. Where a bead of adhesive is used to rigidly connect components 12 and 14, the thickness of the adhesive bead 16 is adjusted to provide the desired spacing. If fasteners such as rivets or screws are employed, Washers are provided to provide the proper spacing.

It must be emphasized that it is not a requirement of the present invention that the shield be assembled with the space 16 between the surfaces 20 and 24. This is a preferred embodiment of the invention only, and the invention contemplates a shield wherein the reflecting and insulating components are assembled with surface 20 adjacent to and in contact with surface 24.

Figure 2:
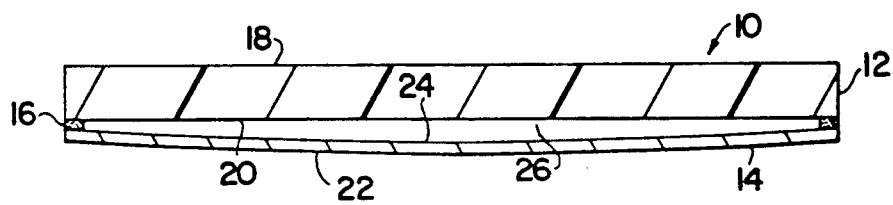
FIG. 2 is a cross-sectional view of the heat shield of claim 1 when subjected to heating.

Referring now to FIGS. 1 and 2, it will readily be understood that With the shield assembled in the manner illustrated in FIG. 1, the components 12 and 14 are restrained from movement relative to one another at the perimeter of the common area; however, the components are free to move relative to each other within this area. When heat is applied to the shield, the heat reflecting component 14 tends to expand at a greater rate, due to its higher coefficient of thermal expansion, than the heat insulating component 12. But, since the components are rigidly connected at the perimeter of the common area, the reflecting component cannot simply expand relative to the insulating component in a direction parallel to surfaces 20 and 24. It has been found that the stress which develops in the shield due to the restricted expansion of the reflecting component in this direction is relieved by an increase in the spacing between surfaces 20 and 24 within the common area. That is, reflecting component 14 tends to bow away from the insulating component 14 and assume the configuration illustrated in FIG. 2.

It has been found that the increase in spacing between the surfaces 20 and 24 is accompanied by a corresponding increase in the insulating capacity of the shield 10. It is not known precisely why this occurs; however, as presently understood, the improved insulating properties of the instant invention may be explained as follows with reference to FIG. 4.

Figure 4:
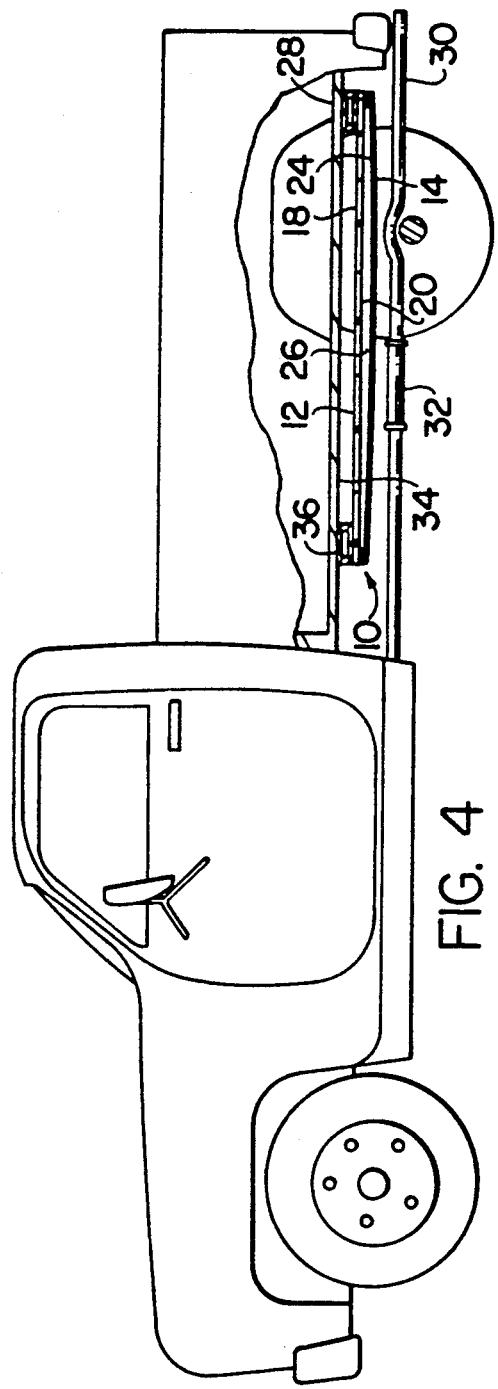
FIG. 4 is a somewhat schematic representation of the heat shield of claim 1 mounted on a motor vehicle.

FIG. 4 illustrates the heat shield 10 disposed between the bed 28 of a typical light duty pick-up truck and a portion of the truck's exhaust system including pipes 30 and muffler 32. As stated Previously with regard to late model vehicles generally, in the area above the truck's rear axle, the exhaust pipes 30 reach temperatures above 800° F. and pass Within a few inches of the lower surface 34 of the bed 28. The temperature of the muffler itself may exceed 1000° F. Due to the limited space generally available between a vehicle's exhaust system and its floor, FIG. 4 illustrates the most preferred automotive application of the present invention, the heat shield 10 is attached adjacent to the lower surface 34 of the bed 28. This may be accomplished by any suitable fastening means but is preferably accomplished by adhesively attaching or screwing the heat shield 10 to the frame 36 Which supports the bed 28.

Turning now to the operation of the shield, as heat from the exhaust pipes and muffler contacts the aluminum sheet comprising the reflecting component 14, much of the incident infrared radiation is reflected back to the environment. However, as the reflecting component is warmed by the small amount of absorbed infrared radiation and by convection, it begins to emit infrared energy at a very low rate according to the equation Emittance = 1 − Reflection.

The space 26 between the reflecting and insulating components minimizes the amount of heat flowing via conduction from the reflecting component 14 to the insulating component 12. As stated previously, the insulating effect of the space, and the shield as a whole, is greatly enhanced as the shield is heated and the reflecting component bows away from the insulating component to increase the space between surfaces 20 and 24. In addition, the heat resistant and reflective paint or foil on the surface 20 of the insulating component reflects some of the incident infrared radiation back to the reflecting component 14. The low thermal conductivity of the insulating component minimizes the conduction of the small amount of heat energy absorbed by the component, and the coating on surface 18 emits infrared energy at only a very low rate to the bed 26.

The advantages of the heat shield taught by the present invention are obvious from the data presented in Table I, which summarizes extensive laboratory testing of various types of heat shield construction, including shields wherein the first member 14 is heat absorbing. Testing such a shield was considered particularly important, since there is at least some possibility that over the life of the shield dirt and other road debris thrown onto the shield by the vehicle's wheels might convert the aluminum surface 22 from a heat reflective surface to one that was heat absorptive.

The heat shields set forth in Table I were constructed as follows:

A. A 12"×21"×0.118" thick "LYTHERM" sheet molded to 1.2 g/cc density, painted on both sides with "Lo/Mit-1" aluminum paint and adhered to a 12"×21"×0.018" polished aluminum sheet by G. E. silicone caulk adhesive applied along the perimeter of the sheets. The sheets were assembled with a 0.031" gap therebetween.

B. Same as A.

C. A 12"×21"×0.118" thick "LYTHERM" sheet molded to 1.2 g/cc density and painted on both sides with "Lo/Mit-1" aluminum paint. The "LYTHERM" sheet was placed in registration and in full contact with a 12'×21'×0.018" polished aluminum sheet. The sheets Were not bonded together and thus could expand independently from one another when heat is applied to the shield.

D. Same as A with the surface of the aluminum sheet facing the heat source coated with black paint.

E. Same as C with the surface of the aluminum sheet facing the heat source coated With black paint.

TABLE I

| HEAT SOURCE 800° F. | |
| --- | --- |
| SHIELD TYPE | FLOOR TEMP °F. |
| Prior Art Metal Stamping Shield Blackened Galvanized | 260° F. |
| Shield A | 165° F. |
| Tested in Room At 100° F. | |

| HEAT SOURCE 800° F. | |
| --- | --- |
| COLD SIDE OF SHIELD | |

TABLE I-continued

| SHIELD TYPE | °F. |
| --- | --- |
| Shield B | 88° F. |
| Shield C | 94° F. |
| Shield D | 158° F. |
| Shield E | 211° F. |
| Tested At Room Temperature | |

While preferred embodiments have been shown and described, various modifications and substitutions may be made without departing from the spirit and the scope of the invention. Accordingly, it is to be understood that the present invention has been described by Way of example and not by limitation.

We claim:

1. A multi-component heat shield comprising:
   a first infrared reflecting component having a first surface,
   a second heat insulating component having a second surface and an opposite surface,
   said first component having a first coefficient of thermal expansion and said second component having a second coefficient of thermal expansion, one of said first and second coefficients of thermal expansion being higher than the other so that said component having the higher coefficient of thermal expansion expands and contracts at a greater rate than said component having the lower coefficient of thermal expansion in response to changes in the temperatures of said first and second components,
   said first and second components being arranged so that at least a portion of said first surface is in registration with at least a portion of said second surface over a common area having a perimeter, and
   means for restraining said first and second components against movement relative to one another at selected positions,
   the movement of said first and second components being unrestrained between said selected positions so that the differences in the lengths of said first and second components between said selected positions due to changes in the temperatures of said first and second components and their different rates of thermal expansion are accompanied by changes in the spacing between said first and second surfaces.

2. The heat shield of claim 1 wherein said infrared reflecting component has a coefficient of thermal expansion higher than that of said heat insulating component.

3. The heat shield of claim 1 Wherein said first and second components are arranged so that said portion of said first surface is disposed adjacent to and in contact with said portion of said second surface.

4. The heat shield of claim i further comprising means for maintaining said Portion of said first surface in spaced relationship to said portion of said second surface.

5. The heat shield of claim 1 wherein said selected positions are located along the perimeter of said common area.

6. The heat shield of claim 1 wherein said means for restraining comprises a fastener selected from the group consisting of rivets, screws, clips, bolts and adhesive.

7. The heat shield of claim 4 wherein said means for restraining comprises adhesive applied along the entire perimeter of said common area.

8. The heat shield of claim 1 wherein said heat insulating component comprises a rigid sheet material.

9. The heat shield of claim 8 Wherein said rigid sheet material is selected from the group consisting of thermoset, thermoplastic and fiber-reinforced composite sheet materials.

10. The heat shield of claim 9 wherein said rigid sheet material is a rigid thermoset sheet material.

11. The heat shield of claim 1 wherein said infrared reflecting component comprises an infrared reflective metallic sheet material.

12. The heat shield of claim 10 wherein said second surface and said opposite surface of said thermoset sheet material is coated with a heat resistant and infrared reflective material.

13. The heat shield of claim 12 wherein said heat resistant and infrared reflective material is selected from the group consisting of aluminum paint and aluminum foil.

14. The heat shield of claim 10 wherein said thermoset sheet material comprises a phenolic sheet molding compound.

15. The heat shield of claim 11 wherein said metallic sheet material comprises aluminum sheet stock.

16. The heat shield of claim 3 wherein said means for restraining said first and second components against movement relative to one another comprises said means for maintaining said portion of said first surface in spaced relationship to said portion of said second surface.

17. A multi-component heat shield comprising:
a first infrared reflecting component having a first surface,
a second thermal insulating component having a second surface and an opposite surface,
said first component having a first coefficient of thermal expansion and said second component having a second coefficient of thermal expansion, one of said first and second coefficients of thermal expansion being higher than the other so that said component having the higher coefficient of thermal expansion expands and contracts at a greater rate than said component having the lower coefficient of thermal expansion in response to changes in the temperatures of said first and second components,
said first and second components being arranged so that at least a portion of said first surface is in registration with at least a portion of said second surface over a common area having a perimeter;
means for maintaining said portion of said first surface in spaced relationship to said portion of said second surface;
means for rigidly connecting said first and second components to one another at selected contact positions so that at each of said selected contact positions said first component is restrained against movement relative to said second component,
the movement of said first and second components being unrestrained between said selected positions so that the differences in the lengths of said first and second components between said selected positions due to changes in the temperatures of said first and second components and their different rates of thermal expansion are accompanied by changes in the spacing between said first and second surfaces.

18. The heat shield of claim 17 wherein said infrared reflecting component has a higher coefficient of thermal expansion than said heat insulating component.

19. The heat shield of claim 17 wherein said means for rigidly connecting said first and second components to one another comprises a fastener selected from the group consisting of rivets, screws, clips, bolts and adhesive.

20. The heat shield of claim 17 wherein said means for rigidly connecting said first and second components to one another comprises said means for maintaining at least a portion of said first and second surfaces in spaced relationship.

21. The heat shield of claim 16 wherein said means for rigidly connecting said first and second components to one another further comprises adhesive applied along the entire perimeter of said common area.

22. The heat shield of claim 17 wherein said heat insulator comprises a rigid sheet material.

23. The heat shield of claim 22 wherein said rigid sheet material is selected from the group consisting of thermoset, thermoplastic and fiber-reinforced composite sheet materials.

24. The heat shield of claim 23 wherein said rigid sheet material is a rigid thermoset sheet material.

25. The heat shield of claim 17 wherein said infrared reflecting component comprises an infrared reflective metallic sheet material.

26. The heat shield of claim 24 wherein said second surface and said opposite surface of said thermoset sheet material is coated with a heat resistive and infrared reflective material.

27. The heat shield of claim 26 wherein said heat resistive and infrared reflective material is selected from the group consisting of aluminum paint and aluminum foil.

28. The heat shield of claim 24 wherein said thermoset material comprises a phenolic sheet moulding compound.

29. The heat shield of claim 25 wherein said metallic sheet material comprises aluminum sheet stock.

30. The heat shield of claim 17 Wherein said means for rigidly connecting said first and second components is a rivet and said means for maintaining at least a portion of said first and second surfaces in spaced relationship is a washer associated with said rivet.

31. A multi-component heat shield comprising:
a first infrared reflecting component having a first surface;
a second heat insulating component having a second surface and an opposite surface;
said first component having a first coefficient of thermal expansion and said second component having a second coefficient of thermal expansion, one of said first and second coefficients of thermal expansion being higher than the other so that said component having the higher coefficient of thermal expansion expands and contracts at a greater rate than said component having the lower coefficient of thermal expansion in response to changes in the temperatures of said first and second components,
said first and second components being arranged so that at least a portion of said first surface is in contact with at least a portion of said second surface over a common area having a perimeter;
means for rigidly connecting said first and second components to one another at selected contact positions so that at each of said selected contact positions said first component is restrained against movement relative to said second component, the movement of said first and second components being unrestrained between said selected positions so that the differences in the lengths of said first and second components between said selected positions due to changes in the temperatures of said first and second components and their different rates of thermal expansion are accompanied by changes in the spacing between said first and second surfaces.

32. The heat shield of claim 31 wherein said infrared reflecting component has a higher coefficient of thermal expansion than said heat insulating component.

33. The heat shield of claim 31 wherein said means for rigidly connecting said first component to said second component comprises a fastener selected from the group consisting of rivets, screws, clips, bolts and adhesive.

34. The heat shield of claim 31 wherein said means for rigidly connecting said first and second components to one another comprises adhesive applied along the entire perimeter of said common area.

35. The heat shield of claim 31 wherein said heat insulator comprises a rigid sheet material.

36. The heat shield of claim 35 Wherein said rigid sheet material is selected from the group consisting of thermoset, thermoplastic and fiber-reinforced composite sheet materials.

37. The heat shield of claim 36 wherein said rigid sheet material is a rigid thermoset sheet material.

38. The heat shield of claim 31 wherein said infrared reflecting component comprises an infrared reflective metallic sheet material.

39. The heat shield of claim 37 wherein said second surface and said opposite surface of said thermoset sheet material is coated with a heat resistive and infrared reflective material.

40. The heat shield of claim 39 wherein said heat resistive and infrared reflective material is selected from the group consisting of aluminum paint and aluminum foil.

41. The heat shield of claim 37 Wherein said thermoset material comprises a phenolic sheet moulding compound.

42. The heat shield of claim 38 wherein said metallic sheet material comprises aluminum sheet stock.

43. A heat shield comprising:
- a first component having a first surface and a non-heat reflective surface,
- a second heat insulating component having a second surface and an opposite surface,
- said first component having a first coefficient of thermal expansion and said second component having a second coefficient of thermal expansion, one of said first and second coefficients of thermal expansion being higher than the other so that said component having the higher coefficient of thermal expansion expands and contracts at a greater rate than said component having the lower coefficient of thermal expansion in response to changes in the temperatures of said first and second components,
- said first and second components being arranged so that at least a portion of said first surface is in registration with at least a portion of said second surface over a common area having a perimeter, and
- means for restraining said first and second components against movement relative to one another at selected positions,
- the movement of said first and second components being unrestrained between said selected positions to that the differences in the lengths of said first and second components between said selected positions due to changes in the temperatures of said first and second components and their different rates of thermal expansion are accompanied by changes in the spacing between said first and second surfaces.

44. The heat shield of claim 43 wherein said first component comprises a non-heat reflective metallic sheet material and has a coefficient of thermal expansion greater than that of said heat insulating component.

45. The heat shield of claim 44 wherein said non-heat reflective metallic sheet material comprises a metallic sheet having a coating of heat absorbing material applied on one side thereof to form said non-heat reflective surface.

46. The heat shield of claim 45 wherein said heat absorbing material is an infrared absorbing paint.

* * * * *